UNITED STATES PATENT OFFICE.

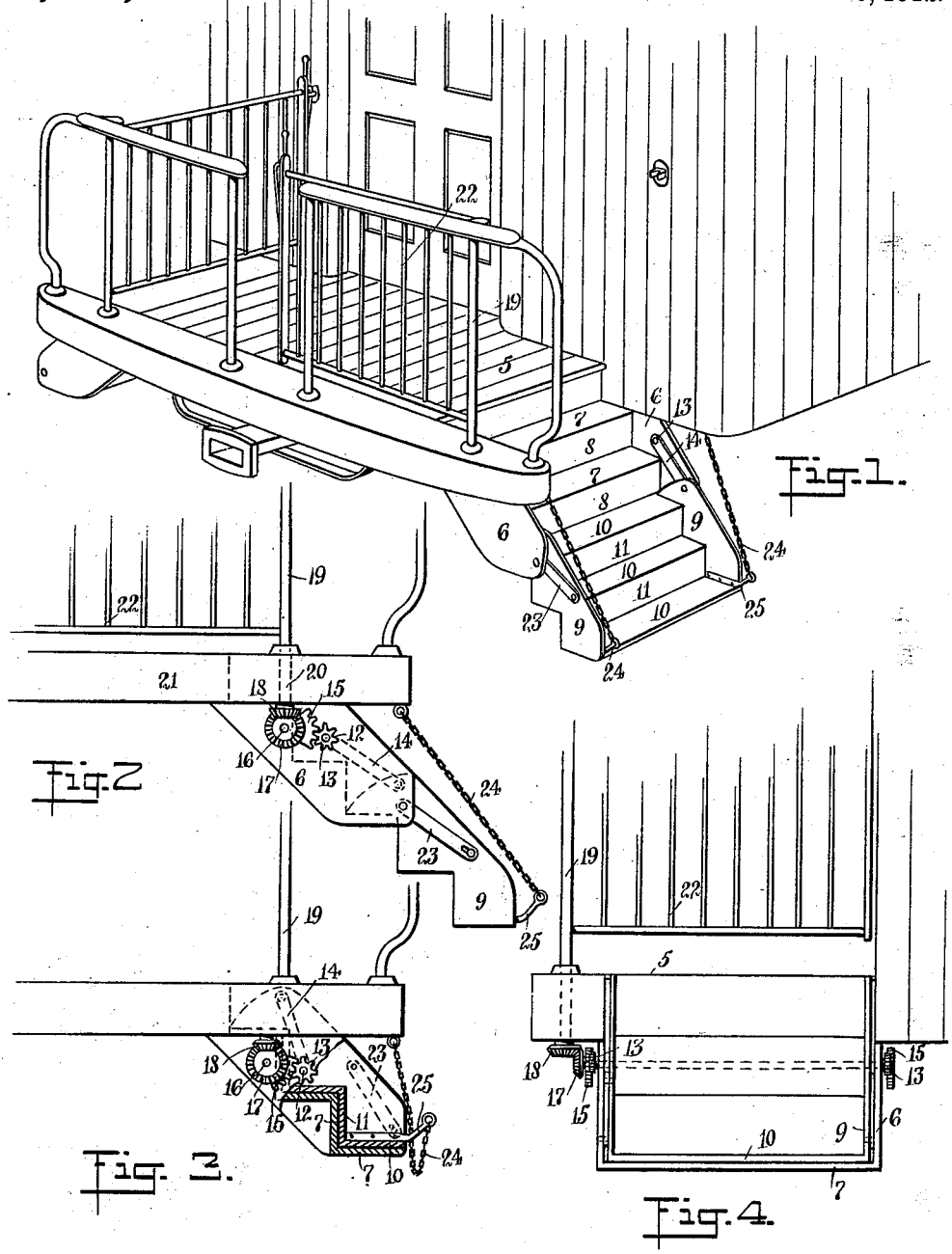

WILLIAM GRAHAM WALTON, OF FERRIDAY, LOUISIANA.

EXTENSION CAR-STEP.

1,014,544.   Specification of Letters Patent.   Patented Jan. 9, 1912.

Application filed September 13, 1911. Serial No. 649,037.

*To all whom it may concern:*

Be it known that I, WILLIAM G. WALTON, a citizen of the United States, and a resident of Ferriday, in the parish of Concordia and State of Louisiana, have invented a new and Improved Extension Car-Step, of which the following is a full, clear, and exact description.

My invention relates to car steps and it has for its object to provide extension steps which are normally raised a distance from the ground and are disposed on stationary steps, the extension steps being lowered automatically by an opening of a gate on the car platform, the mechanism provided for so lowering the extension steps also serving to raise the extension steps automatically when the gate is moved into closed position.

Additional objects of the invention will appear in the following complete specification, in which the preferred form of the invention is disclosed.

In the drawings similar characters of reference indicate corresponding parts in all the views, in which—

Figure 1 is a perspective view of a car platform provided with my extension steps; Fig. 2 is an end view of a car platform showing my extension steps; Fig. 3 is a view similar to that shown in Fig. 2 in section; and Fig. 4 is a view of Fig. 3 looking from the right.

By referring to the drawings it will be seen that extending downwardly from the car platform 5 there are side rails 6, these side rails 6 being spaced apart and being connected by treads 7 and risers 8 which are secured to the side rails. The extension steps have side rails 9 which are connected by treads 10, and risers 11. As will be understood by referring to the drawings the side rails 9 of the extension steps are disposed at the inner sides of the side rails 6 of the stationary steps. Journaled in bearings in the side rails 6 there are studs 12, pinions 13 being secured to these studs 12 at the outer sides of the side rails 6, the links 14 being secured to these pinions 13 at the inner sides of the side rails 6. The pinions 13 are engaged by gear members 15 which are secured to a rock shaft 16 journaled in the side rails 6. Secured to this rock shaft 16 there is a bevel gear 17 this bevel gear 17 being engaged by a bevel gear 18 secured to a standard 19 journaled in bearings 20 in the car platform 5, the gate 22 being secured to and moves with the standard 19 so that when the gate 22 is opened or closed the standard 19 will be rotated, carrying with it the bevel gear 18 which by means of the bevel gear 17 will rock the shaft 16. The lower terminals of the links 14 are articulated to the upper ends of the rails 9 of the extension steps. Articulated at the lower ends of the side rails 6 there are additional links 23 these links being also articulated to the side rails 9 of the extension steps.

To assist in supporting the extension steps chains 24 are provided, these chains being secured to brackets 25 which are in turn secured to the side rails 9 at their lower ends, the upper terminals of the chains 24 being secured to the car.

As the studs 12 are rocked by the mechanism described when the gate 22 is opened or closed, the studs 12 operate the links 14 which are secured thereto, the outer terminals of the said links 14 describing an arc and carrying with them the upper portion of the extension steps. As the upper portion of the extension steps is moved upwardly and inwardly clear of the stationary steps the lower portion of the extension steps is also held clear of the stationary steps by means of the links 23 until the extension steps are disposed as shown in Fig. 3 of the drawings, when the treads of the extension steps rest on the treads of the stationary steps with the extension steps raised a distance from the ground and out of operative position.

Having thus described my invention I claim as new, and desire to secure by Letters Patent:

1. In an extension car step a stationary step and an extension step, movable relatively to the stationary step, two pairs of links pivoted to the extension step and to the stationary step, one pair of links being spaced from the other pair so that the extension may be raised and lowered clear of the stationary step by one of the links, and means to operate the last-mentioned link.

2. In combination with a car a pair of links pivoted to the car, a second pair of links pivoted to the car on an axis disposed below the horizontal plane of the axis of the first links, and extending out beyond the vertical plane of the axis of the first links, and an extensible car step pivoted to the links, which permits the raising and the lowering of the car step as the car step is moved inwardly.

3. In an extension car step a stationary step, an extension step movable relatively to the stationary step, a pair of links one at each side of the stationary step connecting the extension step with the stationary step, a second pair of links one at each side of the stationary step and below the first-mentioned links for connecting the extension step with the stationary step, the links being adapted to raise the extension step and swing it upward and inward.

4. In an extension car step a stationary step, an extension step movable relatively to the stationary step, a pair of links one at each side of the stationary step connecting the extension step with the stationary step, a second pair of links one at each side of the stationary step and below the first-mentioned links for connecting the extension step with the stationary step, the links being adapted to raise the extension step and swing it upward and inward, a gate, and means connecting the gate with one of the links for operating the latter.

5. In an extension car step a stationary step, an extension step movable relatively to the stationary step, links connecting the extension step with the stationary step for holding the extension step clear of the stationary step when the extension step is raised, means for operating one of the links to move the extension step relatively to the stationary step, a gate, and means connecting the gate with one of the links for operating the latter.

6. In an extension car step a stationary step, an extension step movable relatively to the stationary step, links connecting the extension step with the stationary step for holding the extension step clear of the stationary step when the extension step is raised, and means for operating one of the links to move the extension step relatively to the stationary step, a rock shaft having teeth, and teeth meshing with the first-mentioned teeth and movable with one of the links for operating the extension step by means of the rock shaft.

7. In an extension car step a stationary step, an extension step movable relatively to the stationary step, a pair of links one at each side of the stationary step, connecting the extension step with the stationary step, a second pair of links one at each side of the stationary step and below the first-mentioned links for connecting the extension step with the stationary step, the links being adapted to raise the extension step and swing it upward and inward, teeth movable with one pair of links, and a rock shaft having teeth meshing with the first-mentioned teeth by which the last-mentioned links are operable by the rock shaft.

8. In an extension car step a stationary step, an extension step movable relatively to the stationary step, a pair of links one at each side of the stationary step connecting the extension step with the stationary step, a second pair of links one at each side of the stationary step and below the first-mentioned links for connecting the extension step with the stationary step, the links being adapted to raise the extension step and swing it upward and inward, a gate having a gear member secured thereto, a rock shaft having a gear member meshing with the first-mentioned gear member, teeth on the rock shaft, and teeth on one of the links meshing with the last-mentioned teeth on the rock shaft.

9. In combination with a car an extension step movable relatively to the car, a pair of links spaced apart and connecting the extension step with the car, a second pair of links spaced apart, with the terminals at the car disposed below the horizontal plane of the terminals of the first-mentioned links at the car for connecting the extension step with the car, the links being adapted to raise the extension step and swing it upward and inward, a gate, and means connecting the gate with one of the links for operating the latter.

In testimony whereof I have signed my name to this specification in the presence of two subscribing witnesses.

WILLIAM GRAHAM WALTON.

Witnesses:
JOHN E. CLAYTON,
J. ELLIOTT CLAYTON, Jr.

Copies of this patent may be obtained for five cents each, by addressing the "Commissioner of Patents, Washington, D. C."